March 6, 1962   A. V. PEDERSEN ETAL   3,024,395
SPEED CONTROL SYSTEM
Filed May 1, 1959   2 Sheets-Sheet 2
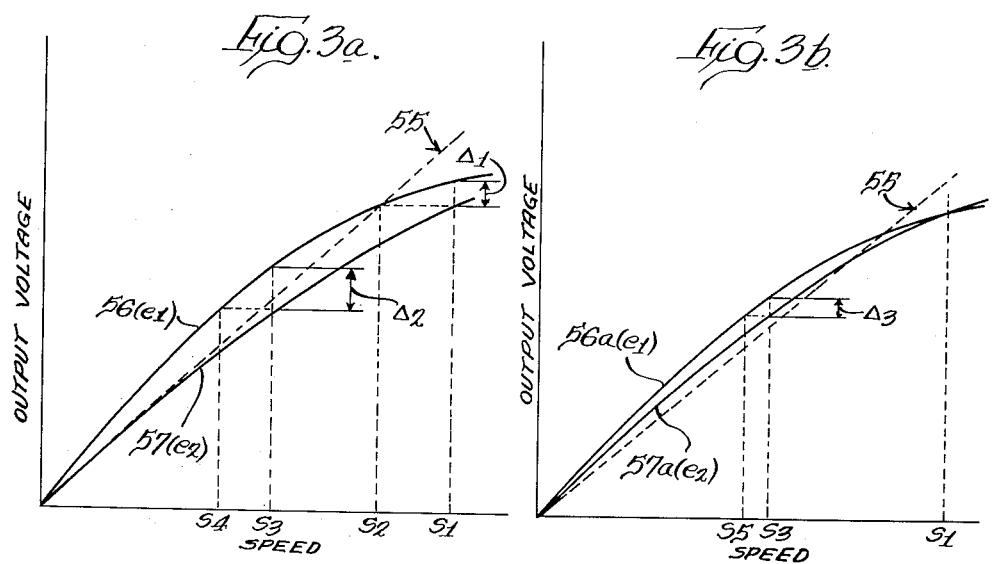
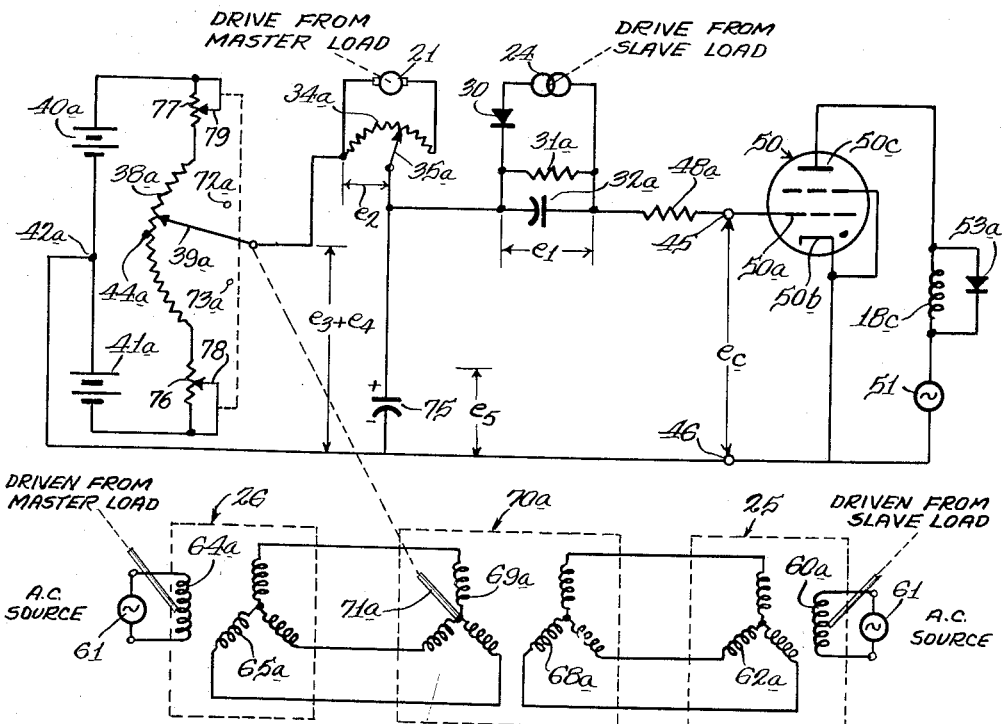
INVENTORS.
Arne V. Pedersen
Emil Richard Wirth
By Wolf, Hubbard, Voit & Osann
Attys.

United States Patent Office

3,024,395
Patented Mar. 6, 1962

3,024,395
SPEED CONTROL SYSTEM
Arne V. Pedersen, Des Plaines, and Emil Richard Wirth, Oak Park, Ill., assignors to Miehle-Goss-Dexter, Incorporated, Wilmington, Del., a corporation of Delaware
Filed May 1, 1959, Ser. No. 810,478
4 Claims. (Cl. 318—71)

The present invention relates in general to speed control systems, and in particular to systems for maintaining the speed of a first member matched or proportional to the speed of a second member, even though the speed of the latter may be varied over a wide range.

The general aim of the invention is to achieve more precise speed control by compensating for the inherent non-linearity and non-uniformity in the characteristics of speed sensing means, such as tachometer generators.

Another object of the invention is to provide a very precise speed control system which is rapid in its response to changes in the master speed, yet stabilized against hunting or oscillation.

It is a further object to provide automatic compensation for mismatch of two speed sensing means by utilizing a second pair of speed sensing elements and means responsive thereto for correctively adjusting an error signal within a "fine" or limited range.

Still another object is to make the compensating means adjust in the error signal so that the compensating effect is the same whether the master speed is set to high or low values.

Other objects and advantages will become apparent as the following description proceeds, taken in conjunction with the accompanying drawings, in which:

FIGS. 3a and 3b are graphic illustrations of speed versus voltage characteristics for tachometer generators, these figures serving to illustrate the critical problem or difficulty which is obviated by the invention; and FIG. 4 is similar to FIG. 2, illustrating a slightly modified arrangement of the control means.

Figures 1, 2:
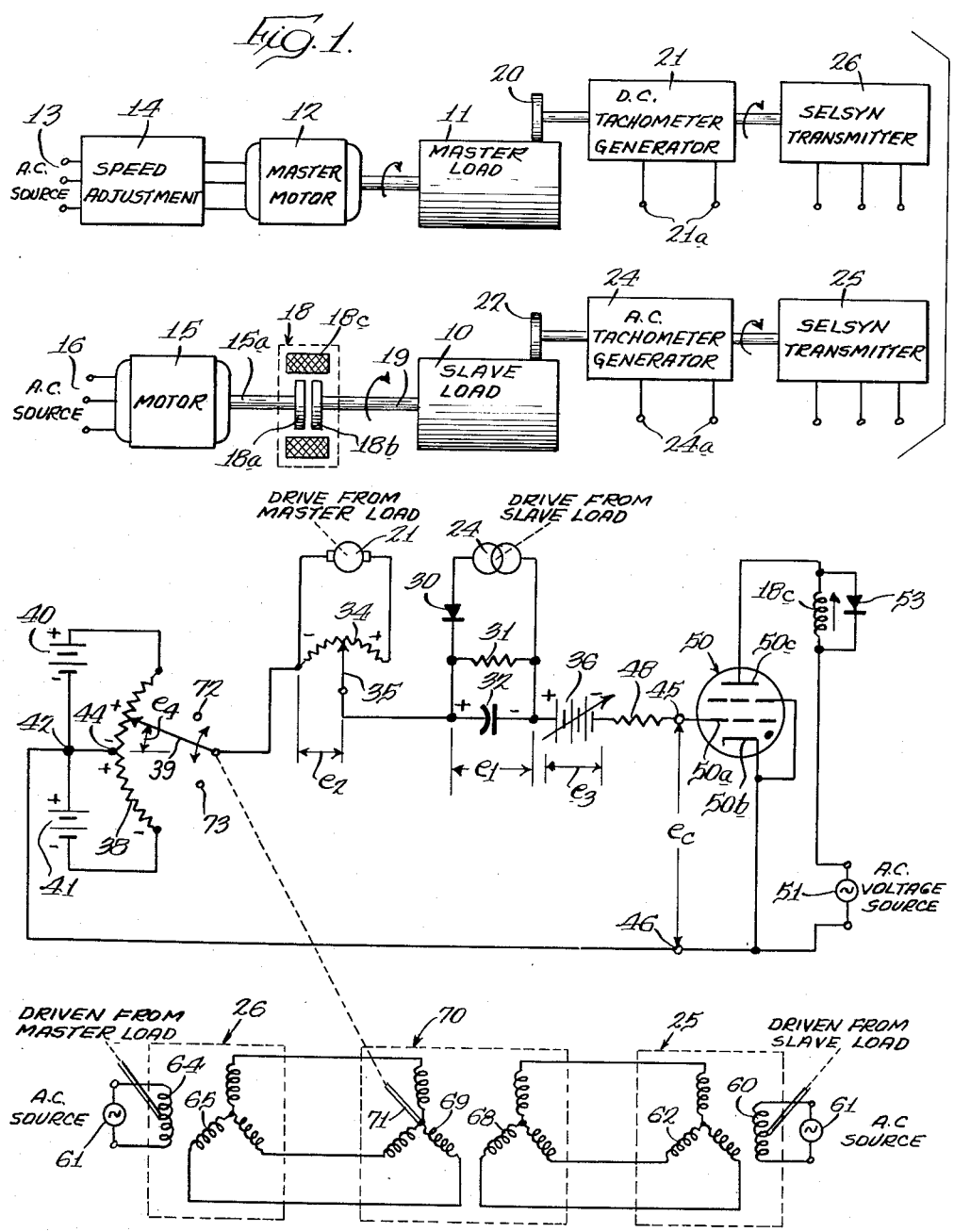
FIGURE 1 is a diagrammatic illustration of apparatus employed in a speed control system embodying the features of the invention.
FIG. 2 is a schematic wiring diagram of speed sensing and controlling means organized in accordance with the invention.

While the invention has been shown and will be described in some detail with reference to particular embodiments thereof, there is no intention that it thus be limited to such detail. On the contrary, it is intended here to cover all alternatives, modifications, and equivalents falling within the spirit and scope of the invention as defined by the appended claims.

Referring now to FIG. 1, the present speed control system is intended to maintain the speed of a first member or slave load 10 equal or proportional to the speed of a second member or master load 11. The master load is illustrated as rotationally driven by a motor 12 energized from an appropriate voltage source 13 through any suitable speed adjuster 14. Suffice it to say that the angular or peripheral speed of the master load 11 may vary over a wide range.

The slave load 10 is driven by controllable means which exert a driving force or torque varying in accordance with a net control signal. While such drive means may take a variety of forms, such as a variably energized motor, they are here shown as including an A.C. induction motor 15 continuously energized from an A.C. voltage source 16. The motor output shaft 15a, which turns at a substantially constant speed in excess of the highest speed required for the load 10, is connected to the input element 18a of a controllable torque device or eddy current clutch 18. The torque transmitted between the clutch input element 18a and a clutch output element 18b coupled by a shaft 19 to the slave load 10 depends upon the magnitude of exciting current supplied to an associated coil 18c. It will be understood that the clutch elements 18a, 18b may "slip" relative to one another so that the slave load 10 does not necessarily rotate at the same speed as the motor shaft 15a. The "slip" and the torque transmitted from the motor 15 to the slave load 10 depend upon the magnitude of exciting current supplied to the clutch coil 18c, such current setting up a magnetic field which induces eddy currents in the elements 18a and 18b and establishing a slippable magnetic coupling between the clutch elements. Since such eddy current clutches are well known to those skilled in the art, it will suffice simply to note here that the steady-state speed of the shaft 19 is always less than the speed of the shaft 15a, and depends upon the steady-state exciting current supplied to the clutch coil 18c.

In many applications of the invention, the rotational speed of the slave load 10 may be controlled to match that of the master load 11. In other cases, however, the peripheral speeds of the two loads may be maintained equal or proportional. For example, if the loads 10 and 11 are paper rolls from which webs are drawn into a printing press, it may be desired to match the peripheral speed of the slave load 10 to the peripheral speed of the master load 11, so that webs drawn from the two paper rolls travel at the same linear speed just before and just after a splicing operation. Since the smaller the diameter of a paper roll, the higher its rotational speed must be to establish a given peripheral speed, the rotational speeds of the loads 10 and 11 are not necessarily equal when their peripheral speeds are equal. Control of peripheral speeds will here be described, but it will be apparent that the invention and its advantages apply equally well to control of rotational or linear speeds.

In order to control the excitation of the clutch coil 18c, first and second means are provided to sense the speeds of the master and slave loads 10 and 11, and to create first and second signals which are substantially proportional to those speeds. As here shown by way of example, the peripheral speed of the master load 11 is sensed and converted into a signal of corresponding magnitude by a roller 20 engaged with the surface of the master load 11 and driving a D.C. tachometer generator 21. Similarly, a roller 22 preferably equal in diameter to the roller 20 rides upon and is driven by the peripheral surface of the slave load 10, such roller in turn driving an A.C. tachometer 24. As will be noted below, the magnitude of the voltage generated by the tachometer 21 and appearing at its output terminals 21a is almost but not precisely linearly related to the peripheral speed of the master load 11. The amplitude of the A.C. voltage appearing at the output terminals 24a of the tachometer 24 is substantially although not precisely proportional to the peripheral speed of the slave load 10. This alternating output of the tachometer 24 may be converted into a D.C. voltage of corersponding magnitude by rectification and filtering, although it will be apparent to those skilled in the art that the tachometer 24 may in the first instance be chosen to be of a direct current type.

For a purpose to be made clear below, two additional speed sensing elements are respectively associated with the slave load 10 and the master load 11. As here shown, these second speed sensing elements take the form of selsyn transmitters 25 and 26 having their rotors drivingly connected to be driven in unison with the corresponding tachometer generators 24 and 21. The manner in which these selsyn transmitters are utilized will be made clear below.

Referring now to FIG. 2, the A.C. tachometer generator 24 is connected through a rectifier or diode 30 to resistor 31 and capacitor 32 in parallel. Due to the rectification of the diode and the filtering action of the resistor and capacitor, a first direct voltage $e_1$ of the polarity indicated is created across the capacitor 32, this voltage being substantially proportional to the speed of the slave load 10.

The D.C. tachometer generator 21 is connected across a potentiometer 34 having a wiper 35, so that a second voltage $e_2$ appears with the polarity indicated between the wiper and the lower end of the potentiometer. This voltage $e_2$ is substantially proportional to the speed of the master load 11, and the factor or ratio of proportionality may be adjusted by manually changing the setting of the wiper 35.

A third voltage $e_3$ is provided by any suitable source, here illustrated as an adjustable battery 36. This third voltage is employed as a bias to establish the normal operating value about which the net control signal, derived as indicated below, varies.

Finally, a fourth or compensating voltage variable in polarity and magnitude is created by a potentiometer 38 having an adjustable wiper 39 and energized by a suitable voltage source here shown as two identical batteries 40, 41 joined at 42. The compensating voltage $e_4$ appearing between the wiper 39 and the junction 42 varies in polarity and magnitude according to the sense and extent of the displacement of the wiper 39 from a center or reference point 44 on the potentiometer. When the wiper 39 is engaged with the reference point 44, the voltage $e_4$ is zero since the point 44 and junction 42 are at the same potential.

In order to derive a net control signal which is the algebraic combination of the signals $e_1$, $e_2$, $e_3$ and $e_4$, these four voltages are connected in series with the polarity shown between two terminals 45, 46. A current limiting resistor 48 is included in the circuit for a purpose to be explained below. A net control voltage $e_c$ appears between the terminals 45, 46 which varies as the algebraic sum of $e_1$ and $e_2$ (having opposite polarities) and $e_4$ about a bias value $e_3$. It will be apparent that as the speed of the slave load 10 increases or decreases above or below the speed of the master load 11 (or a preselected percentage thereof as established by the setting of the ratio potentiometer wiper 35) the control voltage $e_c$ will decrease or increase.

For the purpose of supplying exciting current to the eddy current clutch 18 which varies with the control voltage $e_c$, the terminals 45 and 46 are connected to the control electrode or grid 50a and cathode 50b of an amplifier here shown as a thyratron 50. The clutch coil 18c is connected in series with the anode 50c and cathode 50b through a suitable A.C. voltage source 51.

As is well known, the thyratron may conduct only during those half cycles of the voltage supplied by the source 51 which make the anode 50c positive with respect to the cathode 50b. The phase angle or instant during each such positive half of A.C. voltage at which the thyratron 50 begins conducting or "fires" depends upon the magnitude of the voltage $e_c$ applied between the cathode 50b and grid 50a. The clutch coil 18c thus receives direct current pulses which are of longer or shorter duration as the control voltage $e_c$ becomes more positive or negative. The average D.C. excitation of the clutch coil 18c, and the torque transmitted by the clutch 18 (FIG. 1) thus depends upon the magnitude of the control voltage $e_c$. A diode 53 is preferably connected in parallel with the clutch coil 18c and poled to shunt reverse currents, thereby preventing "ringing" or oscillation due to the stray capacitance of the coil.

Let it be assumed for the moment that the wiper 39 is fixed in the reference position, i.e., engaged at point 44 so that the compensating voltage $e_4$ is zero. If the speed of the slave load 10 should for any reason be less than the speed of the master load 11 (or a selected percentage thereof) the voltage $e_2$ will exceed the voltage $e_1$, making the control voltage $e_c$ more positive than the bias voltage $e_3$ and thus causing a relatively great excitation of the clutch coil 18c. Accordingly, the clutch 18 transmits sufficient torque to the slave load 10 (FIG. 1) to accelerate the latter until the voltage $e_1$ increases to match the voltage $e_2$. With this the speed of the slave load 10 is brought into agreement with the speed of the master load 11, and the average excitation current supplied to the clutch coil 18c is again reduced to a value just sufficient to keep the speeds matched.

On the other hand, if the speed of the slave load 10 should for any reason be greater than the selected percentage of the master load 11, the voltage $e_1$ will exceed the voltage $e_2$, making the control voltage $e_c$ more negative. This reduces or entirely removes the excitation current supplied to the clutch coil 18c and the torque transmitted to the load 10 so that the latter slows down until its speed again matches the speed of the master load. Although not shown here and not forming a part of the claimed invention, means may be employed to impart a braking torque on the load in response to the absence of any excitation current in the coil 18c thus slowing the load 10 more quickly.

The foregoing generalized description of operation presupposes that whenever the speeds of the slave and master loads are matched or reach the desired proportion, the voltages $e_1$ and $e_2$ will cancel one another and regardless of the speed setting of the master load. In practice this assumption is not justified. It has been found that most all devices for producing signals indicative of speeds not only have non-linear but also non-uniform speed versus output characteristics. This is especially true of tachometer generators. The best such generators available to the art do not have perfectly linear characteristics.

Referring to FIGS. 3a and 3b, the straight lines 55 represent the ideal, theoretical linear variation of tachometer output voltage with input speed. In contrast, curves 56 and 57 (FIG. 3a) represent typical variations of the output voltages $e_1$ and $e_2$ as the speeds of the tachometers 24 and 21, respectively, change over a wide range. It will be seen that the output voltages vary non-linearly and non-uniformly, although the degree of such non-linearity has here been purposely exaggerated for purposes of illustration.

From FIG. 3a it will be apparent that if both tachometers 21 and 24 are rotating at the speed S1, the voltage $e_1$ exceeds the voltage $e_2$ by an amount Δ1. This, as explained above, will cause a reduced excitation for the clutch coil 18c, and the slave load 10 will slow down until the system comes to equilibrium with the slave load 10 driving the tachometer 24 at a slower speed S2 which makes the voltages $e_1$ and $e_2$ equal. In like manner, if two tachometers 21 and 24 are both rotating at the same speed S3, an error Δ2 would exist between the two voltages $e_1$ and $e_2$; the slave load 10 would slow down to a speed S4 until the voltage $e_1$ equals the voltage $e_2$. It will be apparent, therefore, that the system will come to equilibrium with different speed errors (S1—S2 and S3—S4) as the master load speed is varied to drive the tachometer 21 at speeds S1 and S3.

This lack of precision in the control of the slave load speed may be avoided at one particular speed in the range of master load speeds. For example, the ratio potentiometer wiper 35 (FIG. 2) may be adjusted to increase the voltage $e_2$ so that it equals the voltage $e_1$ when the two tachometers 21 and 24 are driven at the same speed S1. This is indicated by curves 56a and 57a in FIG. 3b which correspond to curves 56 and 57 in FIG. 3a, except reflecting a change in the position of wiper 35 to increase the ratio between the output of tachometer 21 and the voltage $e_2$. FIG. 3b shows that the error Δ1 of FIG. 3a has been eliminated. However, when both tachometers are rotating at the speed S3, an error Δ3 still exists between the voltages $e_1$ and $e_2$, so that the system will come to equilibrium with slave load 10 at speed S5 while the master load is at speed S3. FIG. 3b thus illustrates that while non-linear, non-uniform characteristics of two tachometers may be matched at one speed, e.g. S1, an equilibrium speed error will exist at all other speeds of the master load.

In accordance with the present invention, the above-described difficulty is obviated through the provision of a second pair of speed sensing elements and means controlled thereby to create a compensating signal which varies between predetermined limits in accordance with changes in the physical phase angle between two elements rotating at speeds proportional to the speeds of the master load and slave load. This compensating signal is then algebraically combined with the speed-responsive signals produced by the two tachometer generators to eliminate the voltage errors Δ (FIGS. 3a and 3b), so that the net control signal always produces the proper excitation current in the clutch coil to make the speed of the slave load equal or proportional to that of the master load regardless of the adjusted speed of the master load.

For this purpose, the selsyn transmitters 25 and 26 are employed as speed sensing elements. As shown in FIG. 2, the selsyn transmitter 25 comprises a stator winding 60 which is energized from an A.C. source 61, and a three-phase rotor winding 62 driven in unison with the tachometer generator 24. In like manner, the selsyn transmitter 26 comprises a stator or field winding 64 continuously energized from the same A.C. source 61, and a three-phase rotor winding 65. These two rotor windings 62, 65 are respectively connected electrically to a three-phase stator winding 68 and a three-phase rotor winding 69 of a differential selsyn receiver 70 having an output shaft 71. As is well known, alternating voltages are induced in the selsyn transmitter rotor windings 62 and 65, the relative phase of such voltages depending upon the relative angular displacements of the respective transmitter rotors. If one of the transmitter rotors is turning faster than the other, then this phase displacement will continually change. The output shaft 71 of the differential receiver is driven toward an angular position which corresponds to the difference in phase between the two A.C. voltages received by the windings 68 and 69. If the phase of these input voltages is continually changing in one direction or the other, then the selsyn receiver shaft 71 will tend to rotate continuously in one direction or the other and at a speed which is determined by the difference in frequency of the two input voltages. When the physical phase angle and the electrical phase angle of the rotor windings 62 and 65 cease to change, the shaft 71 will come to rest at an angular position which corresponds to the phase angle.

In order to create an auxiliary signal which varies between two limits as the physical phase angle between the selsyn transmitter rotors changes, the shaft 71 is mechanically coupled to the wiper 39 of the potentiometer 38 previously described.

Accordingly, a compensating voltage $e_4$ is created between the wiper 39 and the reference point 44, this compensating voltage varying in polarity and magnitude according to the sense and extent of the angular displacement of the shaft 71 from a reference position. This angular displacement and the magnitude of the voltage $e_4$ are limited by stops 72 and 73 which are engaged by the wiper 39 in extreme positions. The receiver 70 cannot drive the wiper 39 beyond these stops, even though it may attempt to do so.

In accordance with the present invention, the compensating voltage $e_4$ is algebraically combined with the two voltages $e_1$ and $e_2$ generated by the tachometers 24 and 21. As previously noted, the voltages $e_1$, $e_2$, $e_3$ and $e_4$ are all connected in series between the terminals 45, 46 so that the net control signal $e_c$ is the algebraic sum thereof.

The effect of the compensating signal $e_4$ is to correct for the non-linearity and mismatch of the voltage versus speed characteristics of the two tachometers 21 and 24. If the compensating signal $e_4$ were not present, then the system would come to equilibrium with the speed of the slave load 10 and tachometer 24 in disagreement with the speed of the master load 11 and the tachometer 21 as explained previously in connection with FIGS. 3a and 3b. But with the selsyn receiver 70 adjusting the potentiometer wiper 39, the compensating voltage $e_4$ correctively increases or decreases the net control signal $e_c$ to make up for any error between the voltages $e_1$ and $e_2$ when the tachometers 21 and 24 are matched in speed. Thus the energization of the clutch coil 18c is adjusted to make the speed of the slave load 10 precisely match that of the master load 11 despite the non-linearity and non-uniformity in the characteristics of the tachometer generators.

If, for example, the speed of the load 10 is considerably less than the speed of the load 11, the voltage $e_1$ will be considerably less than the voltage $e_2$ (FIG. 2). The transmitter rotor 65 will be "lapping" the transmitter rotor 62, so that the receiver shaft tends to rotate continuously, but drives the wiper 39 against the stop 72. Accordingly, the control voltage $e_c$ is increased positively and the excitation of the clutch coil 18c is increased to accelerate the load 10. As the speed of the load 10 and the voltage $e_1$ increase, the clutch coil excitation decreases, but as the speeds of the two tachometers reach agreement, the compensating voltage $e_4$ adds to the voltage $e_2$, so that the excitation current supplied to the clutch coil 18c is held at a value to make speeds of the two tachometers agree. As this speed agreement is reached and the physical phase angle between the rotors 65 and 62 is reduced, the shaft 71 moves the wiper 39 back toward the reference point 44, thereby reducing the magnitude of the compensating voltage $e_4$. The wiper 39 will come to rest when the speeds are exactly matched and the physical phase angle between the rotors 65 and 62 ceases to change. The compensating voltage $e_4$ is thus automatically and correctively varied until the two rotors 62 and 65 turn at exactly the same speed, this equilibrium value of the voltage $e_4$ being automatically adjusted to make up for the error between the two tachometer voltages $e_1$ and $e_2$.

The converse action occurs if, for any reason, the speed of the load 10 is greatly in excess of the speed of the load 11. The voltage $e_1$ will so greatly exceed the voltage $e_2$ that the control voltage $e_c$ will be highly negative and the thyratron 50 entirely non-conductive. The receiver shaft 71 will drive the wiper 39 against the stop 73, making the voltage $e_4$ have its maximum negative value. As the load 10 slows down and the voltage $e_1$ decreases, the excitation of the clutch coil will gradually increase. As the physical phase angle between the rotors 65 and 62 decreases, the shaft 71 retracts the wiper 39 from the stop 73 until that wiper comes to rest at a position which makes the compensating voltage $e_4$ establish an equilibrium clutch excitation with the speeds of the tachometers exactly equal, and even though their output voltage $e_1$ and $e_2$ do not cancel one another.

The selsyn devices and the compensating signal $e_4$ produced thereby thus create a "fine" adjustment in the clutch excitation and slave load speed which works within that precise range of control not made possible by the two tachometer generators alone. Accuracy and stability in the control of the speed of the slave load 10 is greatly enhanced and regardless of the particular speed which the variable speed master load may have.

Turning now to FIG. 4, a modified embodiment of the invention is there illustrated. Because this second embodiment is basically like that of FIG. 2, the same reference characters with the distinguishing suffix "a" are employed, and only the differences will be described.

In FIG. 4, the voltages $e_1$, $e_2$, $e_3$, and $e_4$ previously described with reference to FIG. 2 are not algebraically added by connecting all of them directly in series. Rather, the voltage $e_2$ created by the tachometer generator 21 and ratio potentiometer 34a is algebraically combined with the compensating and bias voltages $e_4$ and $e_3$ to derive a composite voltage $e_5$ which in turn is algebraically added to the voltage $e_1$.

As here shown, a capacitor 75 is connected in series with the capacitor 32a across the terminals 45 and 46. The net control voltage $e_c$ is the algebraic sum of the voltages $e_1$ and $e_5$ appearing on these two capacitors. Connected in series across the capacitor 75 are the voltages providing by the potentiometers 34a, 35a and 38a, 39a, the former voltage being $e_2$.

The potentiometer 38a, 39a in this instance is, however, arranged to produce a voltage between the wiper 39a and the junction 42a which is the sum of a compensating voltage $e_4$ and an adjustable bias voltage $e_3$. For this purpose, the center or reference point 44a is not connected to the junction 42a, and a pair of rheostats 76, 77 are interposed between the batteries 40a, 41a and the respective extremities of the potentiometer 38a. The rheostats 76, 77 have respective wipers 78, 79 which are ganged together and afford complemental adjustment of their effective resistances. That is, as the wiper 78 is adjusted to increase the resistance of the rheostat 76, the wiper 79 is adjusted to correspondingly decrease the resistance of rheostat 77. This keeps constant the total resistance connected in series with the two batteries 40a, 41a.

It will be apparent that when rheostats 76 and 77 have equal effective impedances the reference point 44a will be at the same potential as the junction 42a. As the wipers 78, 79 are adjusted to make these effective resistances unequal, however, the potential of the reference or center point 44a will be made positive or negative with respect to the junction 42a. This creates a bias voltage (corresponding to $e_3$ described above) which is independent of the position of the wiper 39a and which automatically adds to the compensating voltage $e_4$ varying with the position of the wiper 39a. This arrangement is one which conveniently produces a combined adjustable bias and compensating voltage.

The combined voltage $e_3+e_4$ from the potentiometer 38a, 39a is in series with the voltage $e_2$, so that the voltage $e_5$ is the sum of $e_2$, $e_3$ and $e_4$. The net control voltage $e_5$ is added to the voltage $e_1$, so that the net control voltage $e_c$ is the sum of $e_1$, $e_2$, $e_3$ and $e_4$. FIG. 4 therefore represents an arrangement which operates in substantially the same way to produce the same advantages as the system of FIG. 2, but illustrates that the adjustable bias voltage may be combined with the compensating voltage, and that the several voltages need not necessarily be added by a direct series connection.

We claim as our invention:

1. In a system for maintaining the speed of a slave load in correspondence with the speed of a variable speed master load, the combination comprising controllable means for driving said slave load, first and second tachometer generators respectively driven at speeds corresponding to the speeds of said slave and master loads, first and second selsyn transmitters respectively driven at speeds corresponding to the speeds of said slave and master loads, a differential selsyn received electrically connected with said two transmitters and having a rotor, means for creating a voltage which changes in polarity and varies in magnitude according to the sense and displacement of said rotor from a reference position, means for algebraically combining said voltage and the outputs of said two tachometer generators to derive a net control voltage, and means for energizing said driving means in accordance with said net control voltage.

2. In a system for maintaining the speed of a slave load in correspondence with the speed of a variable speed master load, the combination comprising means for driving said slave load at adjustable speeds, first and second tachometer generators respectively driven at speeds corresponding to the speeds of said slave and master loads, said tachometers including means for respectively producing first and second direct voltages which vary almost but not exactly linearly with the speeds at which they are driven, first and second selsyn transmitters respectively driven at speeds corresponding to the speeds of said slave and master loads, a differential selsyn receiver electrically connected with said transmitters and having a rotor which is angularly positioned according to the phase mismatch of said transmitters, means for limiting the angular displacement of said rotor from a reference position, means for creating a third voltage which changes in polarity and varies in magnitude according to the sense and displacement of said rotor from a reference position, means for combining said third, second and first voltages with the latter two being in bucking relation to derive a net control voltage, and means for controlling said driving means in accordance with said net control signal.

3. In a system for keeping the speed of a first member equal or proportional to the speed of a second member movable at different speeds, the combination comprising an eddy current clutch having an input member driven at a speed in excess of the maximum speed of said first member and an output member connected to drive said first member, said clutch having coil and exerting a torque between said input and output members which varies with the excitation current supplied to said coil, a pair of tachometer generators respectively driven at speeds corresponding to the speeds of said first and second members, a pair of selsyn transmitters respectively driven at speeds corresponding to the speeds of said first and second members, said transmitters having means to produce respective alternating voltages at phase angles corresponding to the physical phase angle between said generators, means for creating a compensating voltage which varies in magnitude between predetermined limits with the phase angle between said two alternating voltages, means for algebraically combining the voltage outputs of said tachometer generators and said compensating voltage to derive a net control signal, and an amplifier connected to excite said clutch coil with current varying in accordance with said net control signal.

4. In a system for maintaining the speed of a first member equal or proportional to the speed of a second member movable at different speeds, such system including variable speed means for driving said first member, first and second means for respectively producing first and second signals almost but not precisely linearly related to the speeds of said first and second members, and means for deriving a control signal from the said first and second signals to control said variable speed driving means; that improvement which comprises two rotatable members and means for driving them at speeds respectively proportional to the speeds of said first and second members, means for creating a compensating signal which changes in polarity and magnitude according to the physical phase angle between said two rotatable members, means for limiting the magnitude of said compensating signal, and means for modifying said control signal with said compensating signal.

References Cited in the file of this patent

UNITED STATES PATENTS

| | | |
|---|---|---|
| 2,456,508 | Herwald et al. | Dec. 14, 1948 |
| 2,488,412 | King et al. | Nov. 15, 1949 |
| 2,744,213 | Jaeschke | May 1, 1956 |
| 2,799,817 | Matthes et al. | July 16, 1957 |
| 2,830,243 | Walcott | Apr. 8, 1958 |
| 2,853,666 | Carl et al. | Sept. 23, 1958 |